US007880528B2

(12) United States Patent
Igarashi (10) Patent No.: US 7,880,528 B2
(45) Date of Patent: Feb. 1, 2011

(54) TEMPERATURE DETECTION CIRCUIT (75) Inventor: Atsushi Igarashi, Chiba (JP)

(73) Assignee: Seiko Instruments Inc. (JP)

( * ) Notice: Subject to any disclaimer, the term of this patent is extended or adjusted under 35 U.S.C. 154(b) by 35 days.

(21) Appl. No.: 12/378,190

(22) Filed: Feb. 11, 2009

(65) Prior Publication Data
US 2009/0206912 A1     Aug. 20, 2009

(30) Foreign Application Priority Data

Feb. 18, 2008   (JP) .............................. 2008-036433

(51) Int. Cl.
*H01L 35/00*     (2006.01)
*H01L 37/00*     (2006.01)
*H03K 3/42*      (2006.01)
*H03K 17/87*     (2006.01)

(52) U.S. Cl. ..................................... 327/512
(58) Field of Classification Search .......... 327/512–513
See application file for complete search history.

(56) References Cited

U.S. PATENT DOCUMENTS 7,193,543 B1 *   3/2007   McLeod et al. ............. 341/123

2007/0258503 A1 *   11/2007   Clark et al. ..................... 374/1
2008/0049811 A1 *   2/2008   Hirano ........................ 374/100
2010/0013544 A1 *   1/2010   Niederberger .............. 327/513

FOREIGN PATENT DOCUMENTS

JP              2008014798 A  *  1/2008

OTHER PUBLICATIONS

Patent Abstract of Japan, publication No. 06-242176, publication date Sep. 2, 1994.

* cited by examiner

*Primary Examiner*—Quan Tra
(74) *Attorney, Agent, or Firm*—Adams & Wilks (57) ABSTRACT A temperature detection circuit has a first temperature sensor circuit that outputs a voltage having a negative temperature gradient and an absolute value and a second temperature sensor circuit that outputs a voltage having a positive temperature gradient and the same absolute value as that for the output voltage of the first temperature sensor circuit. A switch circuit conducts a switching operation in accordance with a control signal to switch between outputting the output voltage of the first temperature sensor circuit and the output voltage of the second temperature sensor circuit. A comparison circuit compares the output voltage from the first or second temperature sensor circuit with a reference voltage. A logic circuit outputs a temperature detection signal on the basis of the control signal and an output signal from the comparison circuit.

14 Claims, 7 Drawing Sheets

TEMPERATURE DETECTION CIRCUIT

BACKGROUND OF THE INVENTION

1. Field of the Invention

The present invention relates to a temperature detection circuit using temperature characteristics of a semiconductor circuit.

2. Description of the Related Art

Figure 11:
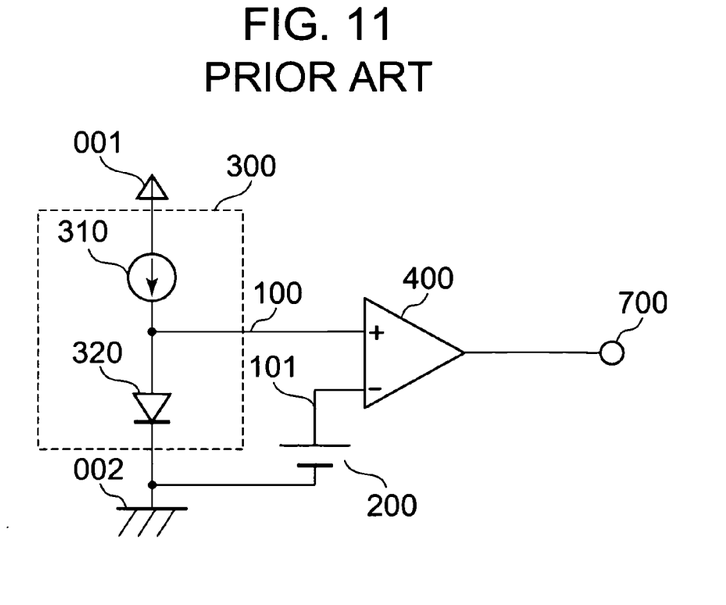
FIG. 11 illustrates a configuration of a conventional temperature detection circuit.

FIG. 11 illustrates a conventional temperature detection circuit.

The temperature detection circuit includes a positive power supply terminal 001, a negative power supply terminal 002, a reference voltage circuit 200, a temperature sensor circuit 300, a comparator 400, and an output terminal 700.

A negative pole of the reference voltage circuit 200 is connected to the negative power supply terminal 002 and a positive pole of the reference voltage circuit 200 as an output terminal 101 is connected to an inverting input terminal of the comparator 400. The reference voltage circuit 200 outputs, at a predetermined temperature, a reference voltage which is equal to an output voltage of the temperature sensor circuit 300.

The temperature sensor circuit 300 includes a constant current source 310 and a diode 320. One end of the constant current source 310 is connected to the positive power supply terminal 001 and the other end of the constant current source 310 is connected to an anode of the diode 320. A cathode of the diode 320 is connected to the negative power supply terminal 002. The anode of the diode 320 as an output terminal 100 is connected to a noninverting input terminal of the comparator 400 and outputs a voltage which is lowered according to a temperature rise.

An output terminal of the comparator 400 is connected to the output terminal 700 of the temperature detection circuit. The comparator 400 compares the reference voltage from the reference voltage circuit 200 and the output voltage of the temperature sensor circuit 300, and, according to the result of the comparison, outputs a negative power supply potential or a positive power supply potential.

Next, operation of the temperature detection circuit is described.

Figure 12:
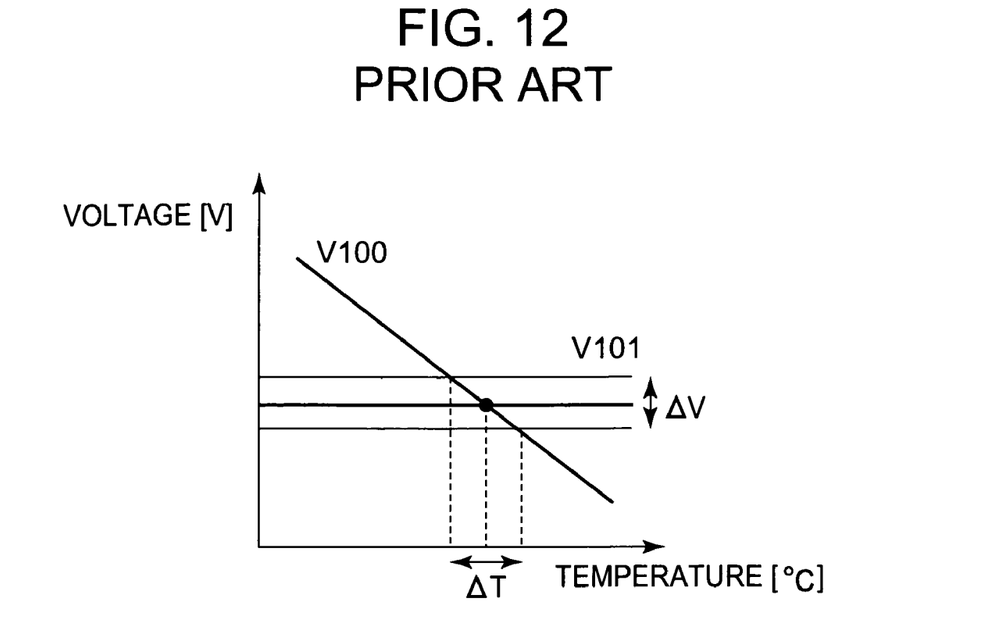
FIG. 12 is a graph illustrating characteristics of the conventional temperature detection circuit.

V100 in FIG. 12 is the voltage at the output terminal 100 of the temperature sensor circuit 300 while V101 is the voltage at the output terminal 101 of the reference voltage circuit 200. When the temperature is lower than a predetermined temperature, because the output voltage V100 is higher than the reference voltage V101, the comparator 400 outputs the positive power supply potential. When the temperature is higher than the predetermined temperature, because the output voltage V100 of the temperature sensor circuit 300 is lower than the reference voltage V101, the comparator 400 outputs the negative power supply potential. In this way, the temperature detection circuit switches the output logic state at the predetermined temperature, and thus, the predetermined temperature can be detected (see Japanese Patent No. 3139194).

Here, although the reference voltage V101 is adjusted to be equal to the output voltage V100 of the temperature sensor circuit 300 at the predetermined temperature, even after the adjustment, a dispersion $\Delta V$ illustrated in the figure is caused.

The dispersion $\Delta V$ in the reference voltage V101 causes a dispersion $\Delta T$ in the detected temperature in the temperature detection circuit. Therefore, in the conventional temperature detection circuit, by imparting negative temperature characteristics to the constant current source 310 or by increasing the number of the diodes 320 connected in series, the temperature gradient of the output voltage V100 is made steep to attempt to suppress the influence of the dispersion $\Delta V$ in the reference voltage V101 on the dispersion $\Delta T$ in the detected temperature.

In a temperature detection circuit, when the temperature to be detected is changed, it is general that the characteristics of the temperature sensor circuit 300 is not changed but the reference voltage V101 of the reference voltage circuit 200 is changed.

Figure 13:
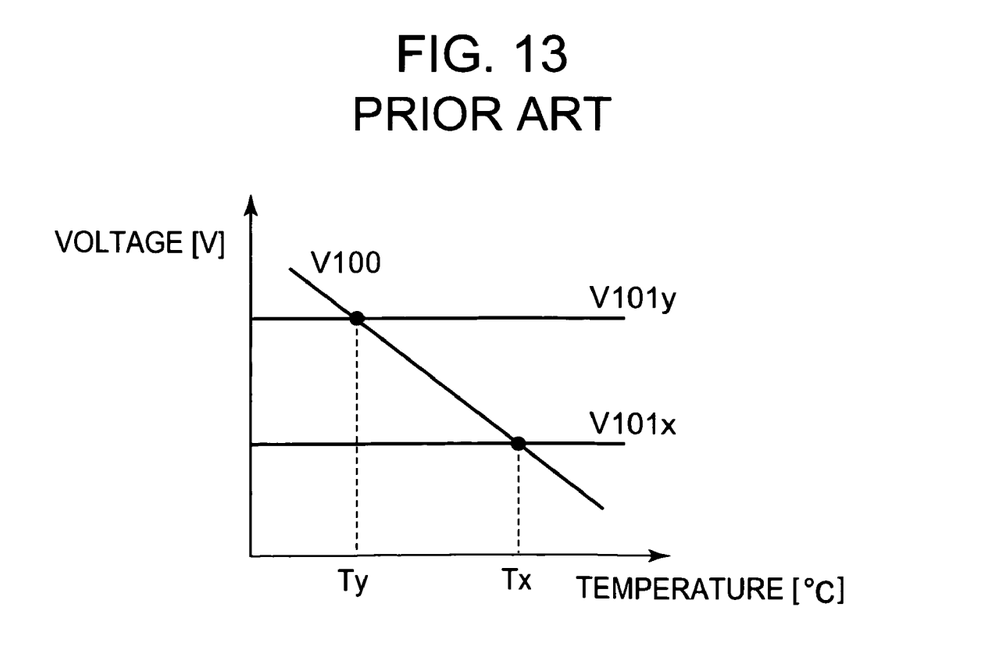
FIG. 13 is a graph illustrating characteristics of the conventional temperature detection circuit.

However, in the temperature detection circuit described above, as illustrated in FIG. 13, with regard to two predetermined temperatures Tx and Ty, the reference voltage V101y at Ty which is lower than Tx is higher than the reference voltage V101x. More specifically, there is a problem in that, the larger the range of the set predetermined temperature becomes toward the lower temperature side, the higher the output voltage V100 and the reference voltage V101 become, and the lowest operating voltage of the temperature detection circuit becomes higher. Conversely, when a temperature sensor circuit having a positive temperature gradient is used, there is a problem in that, the larger the range of the set predetermined temperature becomes toward the higher temperature side, the higher the output voltage V100 and the reference voltage V101 become, and the lowest operating voltage of the temperature detection circuit becomes higher.

SUMMARY OF THE INVENTION

The present invention is made in view of such a conventional problem, and an object of the present invention is to suppress a rise in the lowest operating voltage even when the range of the detected temperature is enlarged.

In order to solve the conventional problem, a temperature detection circuit according to the present invention has the following configuration.

The temperature detection circuit according to the present invention includes:

a temperature sensor circuit for outputting an output voltage according to a temperature;

a reference voltage circuit for outputting a reference voltage;

a comparison circuit for comparing the output voltage of the temperature sensor circuit and the reference voltage; and a logic circuit to which a control signal and the output signal of the comparison circuit are input, for outputting a detection signal which is inverted beyond a predetermined temperature, in which:

the temperature sensor circuit has a function of adjusting characteristics of the output voltage; and the logic circuit has a function of inverting the detection signal based on the control signal in a range in which an output signal of the comparison circuit is effective.

The temperature detection circuit according to the present invention has the function of adjusting characteristics of the output voltage, and is adapted such that the logic circuit has the function of inverting a detection signal based on a control signal in a range in which an output signal of the comparison circuit is effective. Therefore, even the range of the detected temperature is enlarged, a rise in the lowest operating voltage can be suppressed.

DETAILED DESCRIPTION OF THE INVENTION

Embodiments of the present invention are described in detail in the following with reference to the drawings.

Embodiment 1

Figure 1:
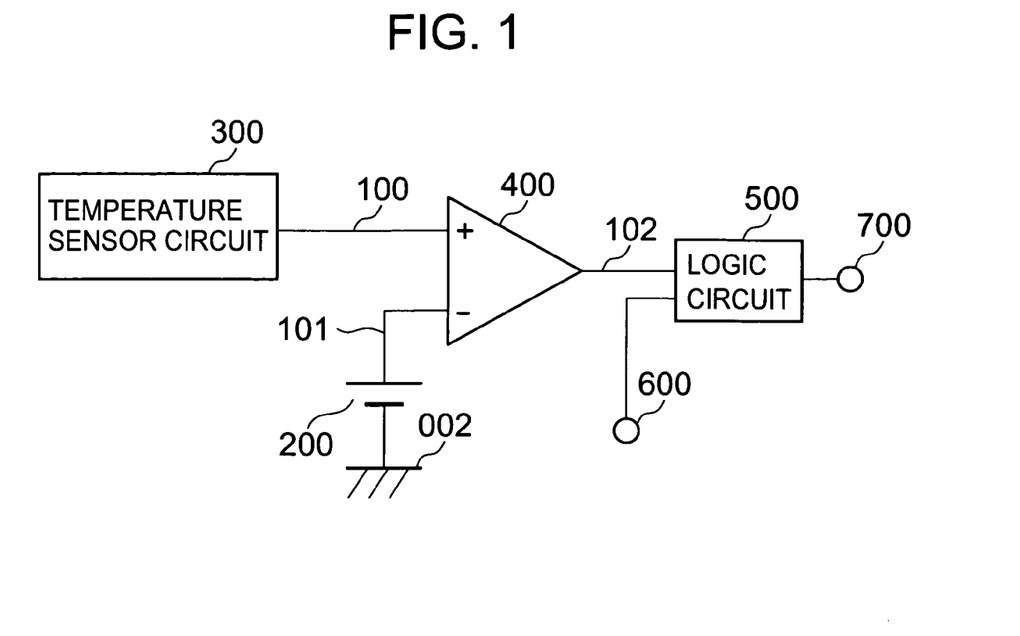
FIG. 1 illustrates a configuration of a temperature detection circuit of the present invention.
Figure 2:
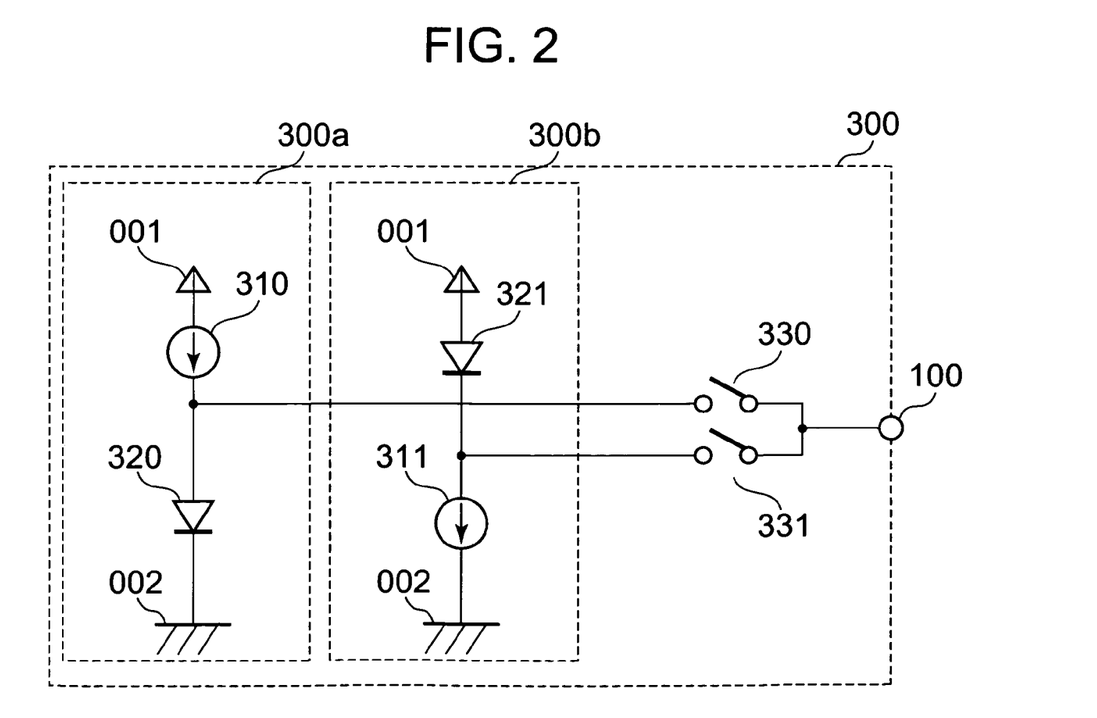
FIG. 2 illustrates a temperature sensor circuit in the temperature detection circuit according to a first embodiment of the present invention.

FIG. 1 illustrates a configuration of a temperature detection circuit according to a first embodiment of the present invention. FIG. 2 is a circuit diagram of an exemplary temperature sensor circuit 300 in the temperature detection circuit according to the first embodiment.

The temperature detection circuit according to the first embodiment includes a positive power supply terminal 001, a negative power supply terminal 002, a reference voltage circuit 200, a temperature sensor circuit 300, a comparator 400, a logic circuit 500, an input terminal 600, and an output terminal 700.

A negative pole of the reference voltage circuit 200 is connected to the negative power supply terminal 002 and a positive pole of the reference voltage circuit 200 as an output terminal 101 is connected to an inverting input terminal of the comparator 400. A reference voltage from the reference voltage circuit 200 is adjusted by changing the size of elements such as a resistor and a MOS transistor with fuse trimming or an EEPROM, and a reference voltage which is equal to an output voltage of the temperature sensor circuit 300 is output at a predetermined temperature.

An output terminal 100 of the temperature sensor circuit 300 is connected to a noninverting input terminal of the comparator 400. The temperature sensor circuit 300 includes, for example, as illustrated in FIG. 2, a temperature sensor circuit 300a, a temperature sensor circuit 300b, switches 330 and 331 for selecting one of the temperature sensor circuits, and the output terminal 100. The temperature sensor circuit 300a includes a positive power supply terminal 001, a negative power supply terminal 002, a constant current source 310, and a diode 320. One end of the constant current source 310 is connected to the positive power supply terminal 001 and the other end of the constant current source 310 is connected to an anode of the diode 320. A cathode of the diode 320 is connected to the negative power supply terminal 002. The temperature sensor circuit 300a outputs a voltage having a negative temperature gradient with the anode of the diode 320 being the output terminal. The temperature sensor circuit 300b includes a positive power supply terminal 001, a negative power supply terminal 002, a constant current source 311, and a diode 321. One end of the constant current source 311 is connected to the negative power supply terminal 002 and the other end of the constant current source 311 is connected to a cathode of the diode 321. An anode of the diode 321 is connected to the positive power supply terminal 001. The temperature sensor circuit 300b outputs a voltage having a positive temperature gradient with the cathode of the diode 321 being the output terminal. An output voltage of the temperature sensor circuit 300a or the temperature sensor circuit 300b is output to the terminal 100.

Here, the temperature sensor circuits 300a and 300b are temperature sensor circuits for outputting voltages having temperature gradients having opposite signs and the same absolute values. The temperature sensor element is not limited to only one diode as illustrated in FIG. 2. A plurality of diodes may be connected in series, or, a combination of elements having temperature characteristics such as a resistor may be used.

An output terminal 102 of the comparator 400 is connected to one input terminal of the logic circuit 500. The comparator 400 compares the reference voltage from the reference voltage circuit 200 and the output voltage of the temperature sensor circuit 300, According to the result of the comparison, the comparator 400 outputs a negative power supply potential or a positive power supply potential.

The other input terminal of the logic circuit 500 is connected to the input terminal 600, and an output terminal of the logic circuit 500 is connected to the output terminal 700 of the temperature detection circuit. The logic circuit 500 outputs to the terminal 700 a negative power supply potential or a positive power supply potential based on the output signal of the comparator 400 and a control signal input from the input terminal 600. The logic circuit 500 in this case may be, for example, formed of an OR circuit.

Figure 3:
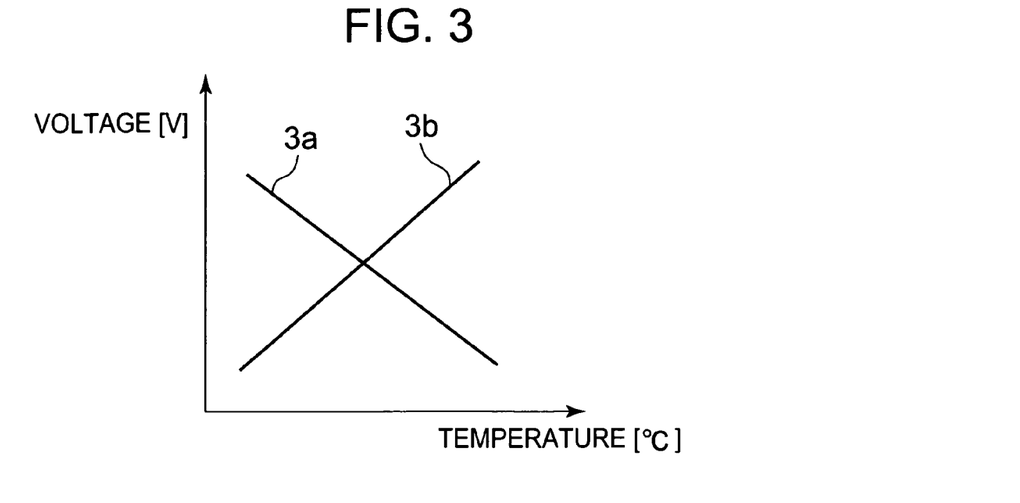
FIG. 3 is a graph illustrating characteristics of the temperature sensor circuit illustrated in FIG. 2.

Next, operation of the temperature detection circuit according to the first embodiment is described. FIG. 3 illustrates output characteristics of the temperature sensor circuit according to the first embodiment. 3a is the output voltage of the temperature sensor circuit 300a while 3b is the output voltage of the temperature sensor circuit 300b.

Figure 4:
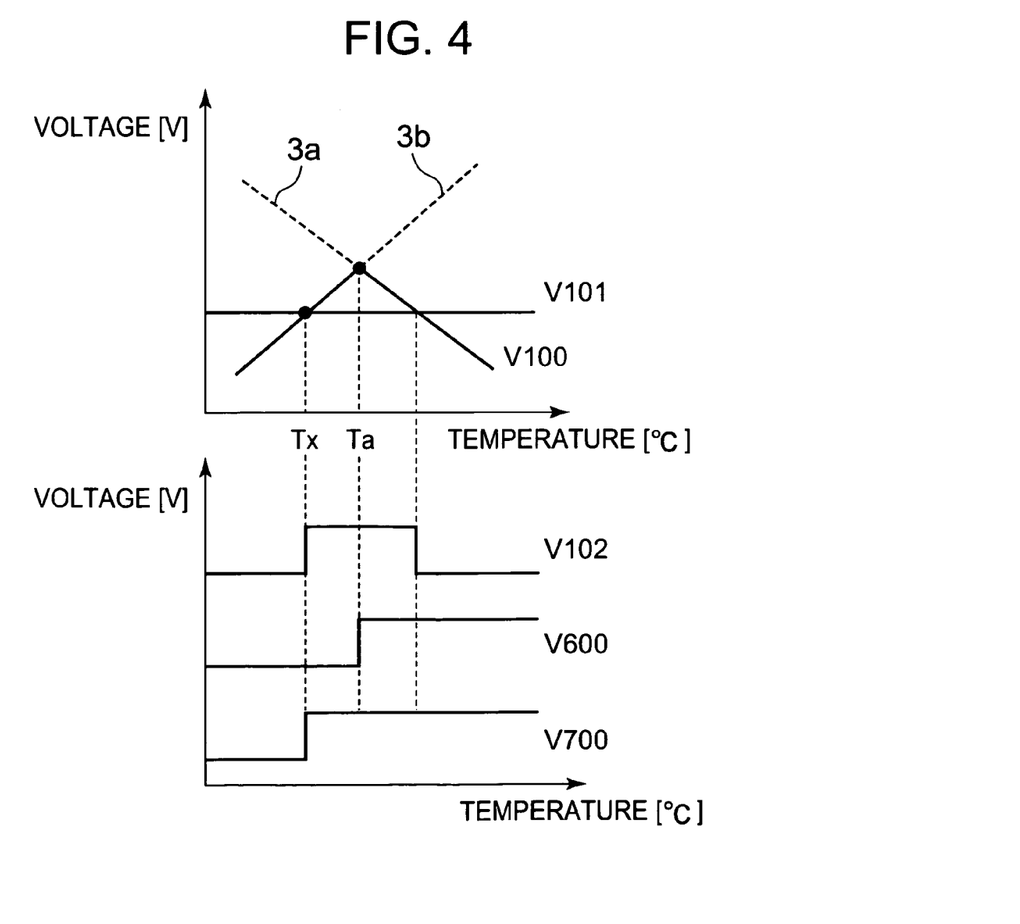
FIG. 4 is a graph illustrating operation of the temperature detection circuit according to the first embodiment of the present invention.

FIG. 4 illustrates operation of the temperature detection circuit according to the first embodiment. V100 is the voltage at the output terminal 100 of the temperature sensor circuit 300, V101 is the voltage at the output terminal 101 of the reference voltage circuit 200, V102 is the voltage at the output terminal 102 of the comparator 400, V600 is the voltage at the input terminal 600, and V700 is the voltage at the output terminal 700 of the temperature detection circuit.

Since the output voltages of the temperature sensor circuits 300a and 300b have the characteristics illustrated as 3a and 3b in FIG. 3, the output voltage V100 of the temperature sensor circuit 300 can be obtained by, for example, controlling the switches 330 and 331 so as to select the lower one of the voltages. Let the temperature at which the output voltage of the temperature sensor circuit 300*a* and the output voltage of the temperature sensor circuit 300*b* intersect be Ta. When the temperature is lower than the temperature Ta, V100 increases at a fixed temperature gradient as the temperature rises, and, when the temperature is higher than the temperature Ta, V100 decreases at a similar temperature gradient with the temperature Ta being the top of the graph.

When the temperature sensor circuit having such temperature characteristics is used, in a case in which a predetermined temperature Tx is set to be lower than Ta, compared with a case in which the temperature sensor circuit having the characteristics of 3*a* in FIG. 3 is used, the reference voltage V101 can be set to be lower. However, with V100 and V101 in FIG. 4 intersecting at two temperatures including the predetermined temperature Tx, the comparator 400 switches the output logic state at the two temperatures. Therefore, by inputting a control signal such as V600 from the input terminal 600, the output voltage V700 switches the output logic state at only the detected temperature, and the predetermined temperature can be detected.

Here, a signal for controlling the switches 330 and 331 may be a signal for inverting a logic state generated by comparing the output voltage of the temperature sensor circuit 300*a* or 300*b* and a reference voltage output by another reference voltage circuit which is not shown, or a signal for inverting a logic state generated by comparing the output voltage of the temperature sensor circuit 300*a* and the output voltage of the temperature sensor circuit 300*b*. Further, the control signal input to the input terminal 600 may be the same as the signal for controlling the switches 330 and 331, or a signal arbitrarily input from the outside.

The temperature sensor circuits 300*a* and 300*b* output voltages having temperature gradients having opposite signs and the same absolute values. The accuracy of the detected temperature remains the same in whichever region the predetermined temperature is set. Although, in FIG. 4, operation when the predetermined temperature Tx is set to be lower than Ta is described, the predetermined temperature Tx may be set to be higher than Ta. In that case, it is enough that an inverted signal is input as the control signal V600.

The temperature detection circuit according to the first embodiment configured as described above can, when the accuracy of the detected temperature is maintained and the set range of the detected temperature is enlarged, suppress a rise in the lowest operating voltage of the temperature detection circuit.

Embodiment 2

Figure 5:
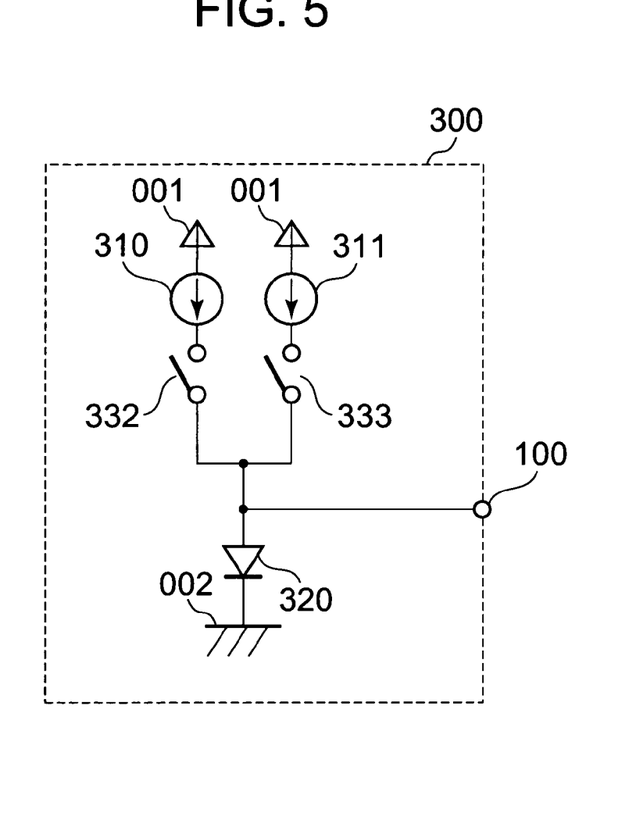
FIG. 5 illustrates a temperature sensor circuit in a temperature detection circuit according to a second embodiment of the present invention.

FIG. 5 is a circuit diagram of a temperature sensor circuit in a temperature detection circuit according to a second embodiment of the present invention. A temperature sensor circuit 300 of the temperature detection circuit according to the second embodiment includes constant current sources 310 and 311, a diode 320, and switches 332 and 333.

One end of the constant current source 310 is connected to a positive power supply terminal 001 and the other end of the constant current source 310 is connected to the switch 332. One end of the constant current source 311 is connected to a positive power supply terminal 001 and the other end of the constant current source 311 is connected to the switch 333. A cathode side electrode of the diode 320 is connected to a negative power supply terminal 002, and an anode side electrode of the diode 320 is connected to the other end of the switch 332, the other end of the switch 333, and an output terminal 100.

Figure 6:
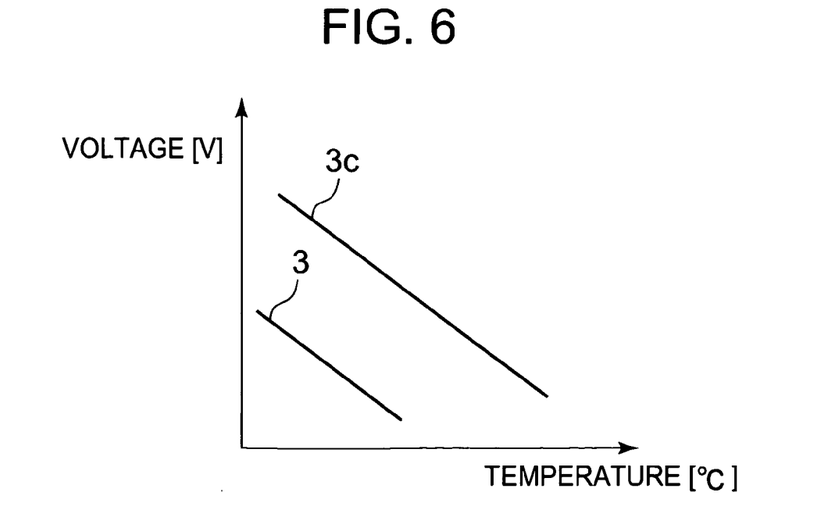
FIG. 6 is a graph illustrating characteristics of the temperature sensor circuit illustrated in FIG. 5.
Figure 7:
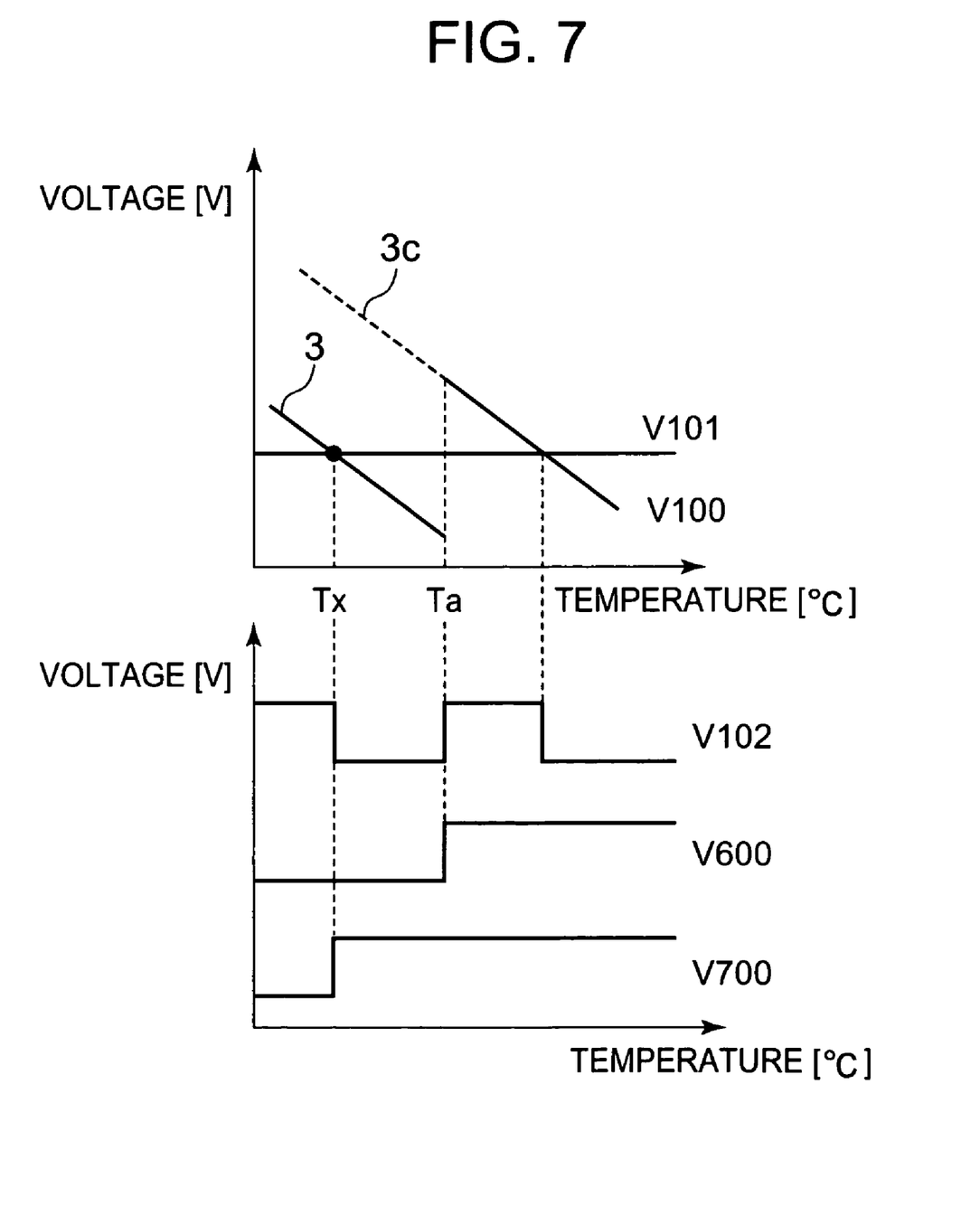
FIG. 7 is a graph illustrating operation of the temperature detection circuit according to the second embodiment of the present invention.

Next, operation of the temperature detection circuit is described. 3*c* of FIG. 6 is the voltage at the output terminal 100 when the constant current source 310 feeds the diode 320, and 3 is the voltage at the output terminal 100 when the constant current source 311 feeds the diode 320 in the temperature sensor circuit 300 illustrated in FIG. 5. V100 of FIG. 7 is the voltage at the output terminal 100 of the temperature sensor circuit 300, V101 is the voltage at the output terminal 101 of the reference voltage circuit 200, V102 is the voltage at the output terminal 102 of the comparator 400, V600 is the voltage at the input terminal 600, and V700 is the voltage at the output terminal 700 of the temperature detection circuit. The logic circuit 500 in this case may be, for example, formed of a NAND circuit for inverting and inputting the control signal V600.

By adjusting the value of the constant current to be fed to the diode 320 by way of controlling the switches 332 and 333 according to the temperature, the characteristics of V100 illustrated in FIG. 7 can be obtained. When the temperature sensor circuit which has such temperature characteristics is used, in a case in which the predetermined temperature Tx is set to be lower than Ta, compared with a case in which the temperature sensor circuit having the characteristics of 3*c* in FIG. 6 is used, the reference voltage V101 can be set to be lower. However, with V100 and V101 in FIG. 7 intersecting at two temperatures including the predetermined temperature Tx, the comparator 400 switches the output logic state at the two temperatures. Therefore, by inputting a control signal such as V600 from the input terminal 600, the output voltage V700 switches the output logic state at only the detected temperature, and the predetermined temperature can be detected.

Here, a signal for controlling the switches 332 and 333 may be a signal for inverting a logic state generated by comparing the output voltage of the temperature sensor circuit 300 and a reference voltage output by another reference voltage circuit which is not shown and depending on whether or not the output voltage is higher than the reference voltage. Further, the control signal input to the input terminal 600 may be the same as the signal for controlling the switches 330 and 331, or a signal arbitrarily input from the outside.

In order to decrease the output voltage of the temperature sensor circuit when the temperature is low, it is possible to decrease the number of the diodes connected in series, but in this case, the temperature gradient of the output voltage of the temperature sensor circuit becomes gentle, which results in lowering the accuracy of the detected temperature on the lower temperature side. Therefore, it is desirable to, as in the circuit according to the present invention, lower the voltage level by adjusting the current value without changing the number of the diodes connected in series.

The temperature detection circuit according to the second embodiment described above can, when the accuracy of the detected temperature is maintained and the set range of the detected temperature is enlarged, suppress a rise in the lowest operating voltage of the temperature detection circuit.

Figure 8:
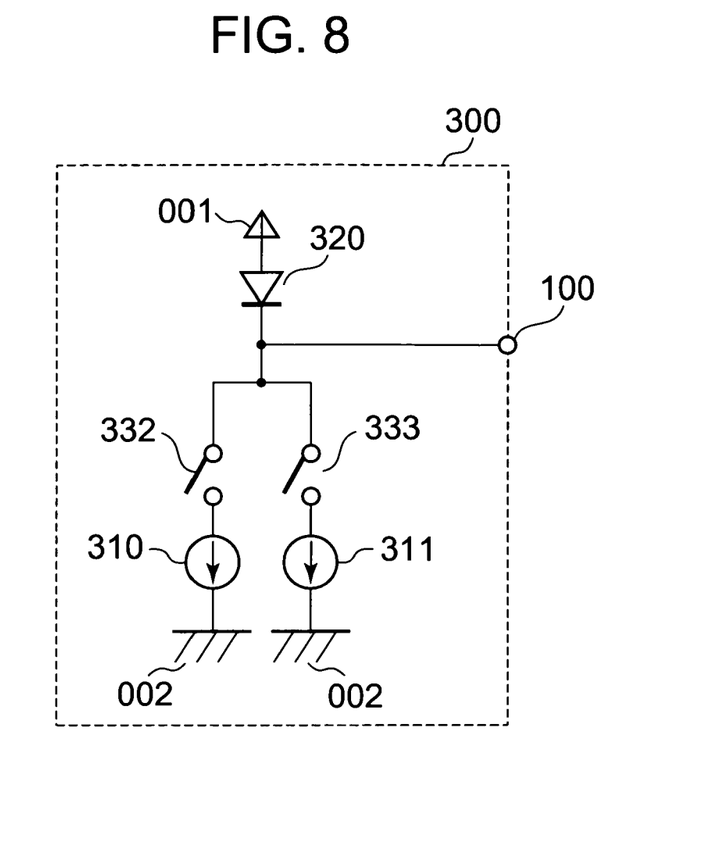
FIG. 8 illustrates another temperature sensor circuit according to the second embodiment of the present invention.
Figure 9:
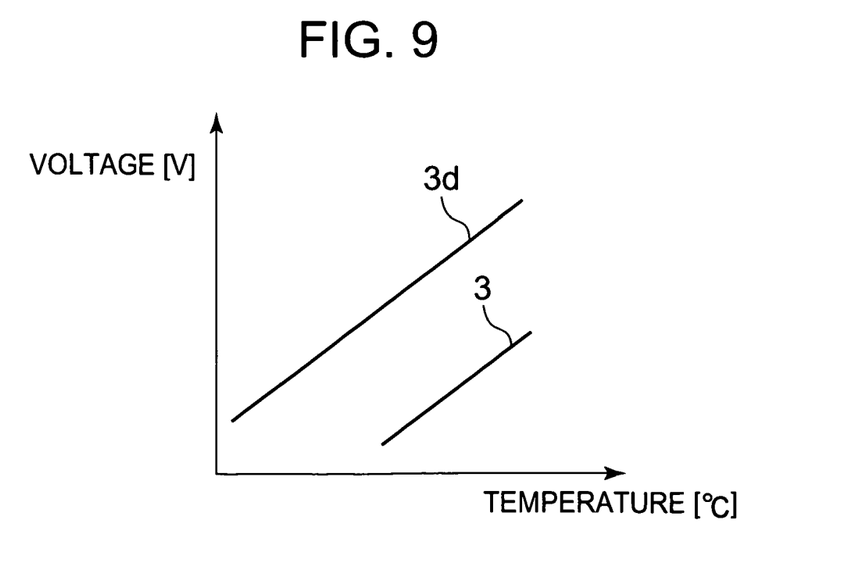
FIG. 9 is a graph illustrating characteristics of the temperature sensor circuit illustrated in FIG. 8.

Further, when the diode 320 having the characteristics as illustrated in FIG. 9 is used in the temperature detection circuit according to the second embodiment, by configuring the temperature sensor circuit as illustrated in FIG. 8, similar effects can be obtained.

Figure 10:
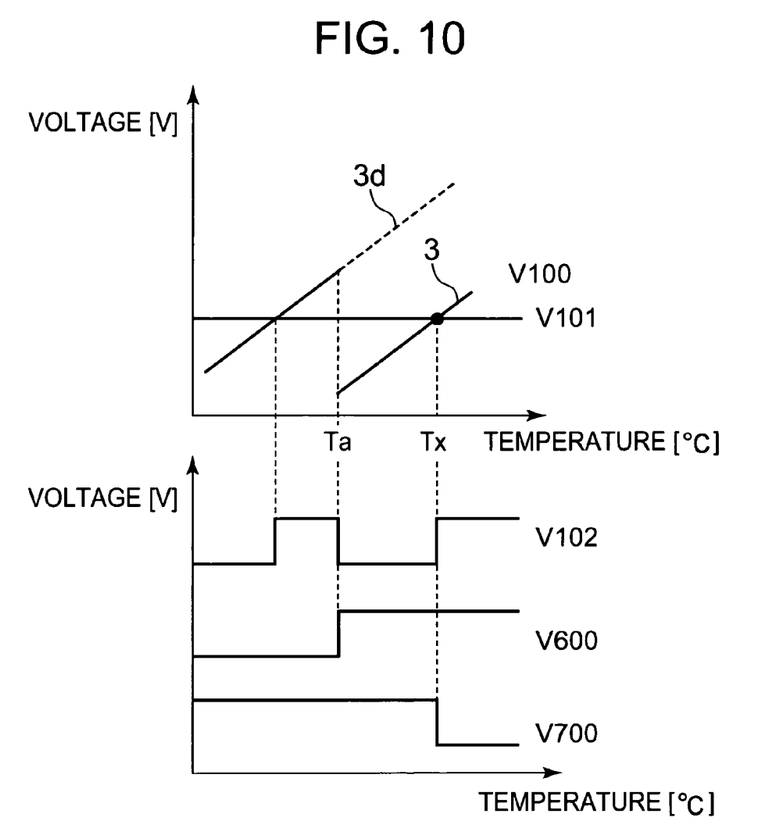
FIG. 10 is a graph illustrating operation of another temperature detection circuit according to the second embodiment of the present invention.

FIG. 10 illustrates operation waveforms of the voltage V102 at the output terminal 102 of the comparator 400, the voltage V600 at the input terminal 600, the voltage V100 at the output terminal 100 of the temperature sensor circuit 300, and the voltage V101 at the output terminal 101 of the reference voltage circuit 200, and the output waveform of the voltage V700 at the output terminal 700 of the temperature detection circuit at that time. The logic circuit 500 in this case may be, for example, formed of a NAND circuit.

Here, a signal for controlling the switches 332 and 333 may be a signal for inverting a logic state generated by comparing the output voltage of the temperature sensor circuit 300 and a reference voltage output by another reference voltage circuit which is not shown and depending on whether or not the output voltage is higher than the reference voltage. Further, the control signal input to the input terminal 600 may be the same as the signal for controlling the switches 330 and 331, or a signal arbitrarily input from the outside. Further, the control signal input to the input terminal 600 may be the same as the signal for controlling the switches 332 and 333, and the logic state of the control signal thereof may be fixed when the predetermined temperature and the reference voltage are set.

In order to decrease the output voltage of the temperature sensor circuit when the temperature is high, it is possible to decrease the number of the diodes connected in series, but in this case, the temperature gradient of the output voltage of the temperature sensor circuit becomes gentle, which results in lowering the accuracy of the detected temperature on the higher temperature side. Therefore, it is desirable to, as in the circuit according to the present invention, lower the voltage level by adjusting the current value without changing the number of the diodes connected in series.

When the accuracy of the detected temperature is maintained and the set range of the detected temperature is enlarged, the temperature detection circuit described above can similarly suppress a rise in the lowest operating voltage of the temperature detection circuit.

What is claimed is:

1. A temperature detection circuit, comprising:
   a first temperature sensor circuit that outputs a first output voltage according to a temperature, the first temperature sensor circuit having a first constant current source and a first temperature sensor element connected between a positive power supply terminal and a negative power supply terminal;
   a second temperature sensor circuit that outputs a second output voltage according to the temperature, the second temperature sensor circuit having a second temperature sensor element and a second constant current source connected between the positive power supply terminal and the negative power supply terminal;
   a switch circuit that conducts a switching operation in accordance with a control signal to switch between the first temperature sensor circuit and the second temperature sensor circuit to output the first output voltage and the second output voltage, respectively;
   a reference voltage circuit that outputs a reference voltage;
   a comparison circuit that compares the reference voltage from the reference voltage circuit with the first output voltage or the second output voltage that is output in accordance with the switching operation by the switch circuit; and
   a logic circuit to which the control signal and an output signal from the comparison circuit are input and that outputs a detection signal that is inverted on the basis of the control signal in a range in which the output signal from the comparison circuit is effective.

2. A temperature detecting circuit according to claim 1; wherein the first and second output voltages of the first and second temperature sensors, respectively, have temperature gradients having opposite signs and the same absolute values.

3. A temperature detecting circuit according to claim 1; wherein each of the first and second temperature sensors comprises a diode.

4. A temperature detecting circuit according to claim 1; wherein each of the first and second temperature sensors comprises a plurality of diodes connected in series.

5. A temperature detecting circuit according to claim 1; wherein one of the first and second output voltages has a lower output voltage than the other of the first and second output voltages; and wherein the switch circuit conducts the switching operation in accordance with the control signal to output the lower one of the output voltages.

6. A temperature detecting circuit according to claim 1; wherein an output terminal of the comparison circuit is connected to one input terminal of the logic circuit.

7. A temperature detecting circuit according to claim 6; wherein the comparison circuit outputs a negative power supply potential or a positive power supply potential in accordance with a result of the comparison.

8. A temperature detecting circuit according to claim 7; further comprising an input terminal to which is input the control signal; and an output terminal; wherein another input terminal of the logic circuit is connected to the input terminal and an output terminal of the logic circuit is connected to the output terminal of the temperature detecting circuit; and wherein the logic circuit outputs to the output terminal of the temperature detecting circuit a negative power supply potential or a positive power supply potential on the basis of the output signal of the comparison circuit and the control signal input from the input terminal of the temperature detecting circuit.

9. A temperature detection circuit comprising:
   a first temperature sensor circuit that outputs a voltage having a negative temperature gradient and an absolute value, the first temperature sensor circuit having a positive power supply terminal, a negative power supply terminal, a first constant current source, and a first temperature sensor element;
   a second temperature sensor circuit that outputs a voltage having a positive temperature gradient and the same absolute value as that for the output voltage of the first temperature sensor circuit, the second temperature sensor circuit having the positive power supply terminal, the negative power supply terminal, a second constant current source, and a second temperature sensor element;
   an input terminal that inputs a control signal;
   an output terminal that outputs the output voltage of the first temperature sensor circuit or the output voltage of the second temperature sensor circuit;
   a switch circuit that conducts a switching operation in accordance with a control signal input by the input terminal to control the output terminal to switch between outputting the output voltage of the first temperature sensor circuit and the output voltage of the second temperature sensor circuit;
   a reference voltage circuit that outputs a reference voltage;
   a comparison circuit that compares the reference voltage from the reference voltage circuit with the output voltage from the output terminal; and
   a logic circuit that outputs a temperature detection signal on the basis of the control signal and an output signal from the comparison circuit.

10. A temperature detecting circuit according to claim 9; wherein each of the first and second temperature sensors comprises a diode.

11. A temperature detecting circuit according to claim 9; wherein each of the first and second temperature sensors comprises a plurality of diodes connected in series.

12. A temperature detecting circuit according to claim 9; wherein the output voltage of one of the first and second temperature sensor circuits is lower than the output voltage of the other of the first and second temperature sensor circuits; and wherein the switch circuit conducts the switching operation so that the output terminal outputs the lower output voltage.

13. A temperature detecting circuit according to claim 9; wherein an output terminal of the comparison circuit is connected to one input terminal of the logic circuit.

14. A temperature detecting circuit according to claim 13; wherein the comparison circuit outputs a negative power supply potential or a positive power supply potential in accordance with a result of the comparison.

* * * * *